Patented Sept. 28, 1943

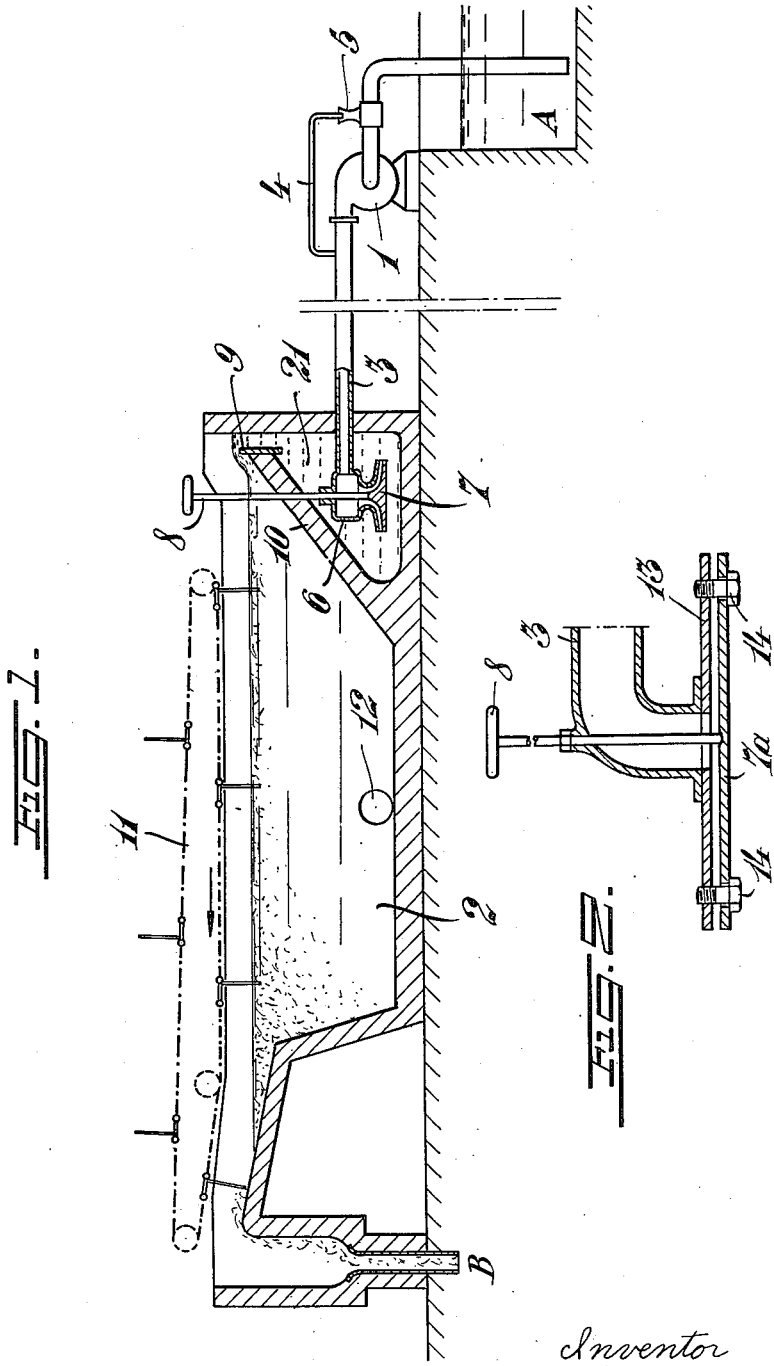

2,330,589

UNITED STATES PATENT OFFICE 2,330,589

METHOD AND DEVICE FOR SEPARATING SOLID SUBSTANCES FROM SUSPENSIONS

Fredrik Juell, Oslo, Norway; vested in the Alien Property Custodian

Application December 31, 1940, Serial No. 372,654
In Sweden January 24, 1940

7 Claims. (Cl. 210—53)

In order to recover solid substances from suspensions of such substances in a liquid it is known to use a method of flotation in which a gas, generally air, is continuously dissolved under pressure in the suspension and then the pressure is lowered again to separate the gas from the liquid in a separating apparatus. In such process the gas separated in fine bubbles from the liquid adheres to the solid particles in the liquid and causes the latter to rise to the free surface of the liquid in the separating apparatus. An addition of a suitable flotation reagent to the suspension will generally cause the solid particles to adhere more strongly to the gas bubbles. Such method is, for instance, extensively used for the purpose of recovering paper fibres and other solid substances from the backwater (waste water) from machines for manufacturing paper, cellulose and woodpulp. To lower the pressure the suspension together with the gas dissolved therein under pressure, is discharged through a pressure reducing valve into a separating vessel being under atmospheric pressure. In another known process the fibre-containing water in which a gas, for instance air, is dissolved, is sucked into a separating apparatus, in which there is a vacuum, which separates the gas from the water to effect flotation. The first-mentioned process for treating suspensions has the disadvantage, that a considerable portion of the gas dissolved still remains dissolved in the liquid on account of the fact, that the pressure is decreased only to atmospheric pressure. In the last-mentioned process, the gas is more completely separated from the liquid, but on the other hand, this process has the disadvantage, that it is difficult to carry out and requires an apparatus which is comparatively expensive.

The chief purpose of this invention is to cause an effective separation of the gas dissolved in the liquid under pressure, even if the flotation is carried out in an open separating apparatus at atmospheric pressure.

Another purpose of this invention is to utilize, in a nozzle device, the kinetic energy of the flowing suspension for producing a pressure below atmospheric within the device, thus accelerating the separation or liberation of the gas.

Another purpose of this invention is to create a simple, inexpensive, automatic and reliable apparatus for effecting such flotation.

Other purposes will be evident from the following specification and claims.

The invention is illustrated in the annexed drawing.

Fig. 1 shows a sectional view of a flotation apparatus in which the method is carried out, especially for recovering the fibres from fibrous water, for instance the backwater from a paper or cellulose manufacturing machine.

Fig. 2 shows, on a larger scale, a vertical section through a preferred embodiment of the nozzle device.

Referring now to Fig. 1 of the drawing, the reference numeral 1 indicates a centrifugal pump for supplying fibrous water, from which the fibres are to be recovered, from a container A, under pressure through a tube 3 to an open vessel or tank 2. From the pressure side of the pump a return pipe 4 leads to an injector 5 on the suction side. This injector forces finely distributed air into the fibrous water, this air being then more or less completely dissolved in the water under the pressure produced by the pump 1. Into a special compartment 21 of the tank 2, the tube 3 discharges via a nozzle device 6, the outlet of which is so shaped, that a vacuum (pressure below atmospheric) is produced within the same by the water flowing out. This vacuum accelerates the separation of the air dissolved from the water. For obtaining the result desired the channel of the nozzle preferably has a cross-section which increases continuously in the direction of flow and is adjustable. In the embodiment shown in Fig. 1 the interior wall of the nozzle is bent very much (approximately 90° from the smallest cross-section of the channel) and a plate-shaped disc 7 is mounted in front of the mouth of the channel. The disc 7 is carried by a screw-spindle 8, which is screwed into the casnig of the device 6. By turning this spindle 8, the disc 7 may be adjusted to and from the mouth of the nozzle and, thus, the cross-section of the channel of the nozzle may be regulated, as wanted. The air liberated during the discharge is very finely distributed in the water and forms fine bubbles adhering to the fibres contained in the water. On account of the vacuum produced by the water flowing through the channel of the nozzle, the air is very efficiently separated from the water and it turns out that the air thus separated only slightly is solved in the water again, when the pressure at the discharge end of the channel of the nozzle again rises to atmospheric pressure. After the water together with the fibres contained therein has passed over the overflow 9 on the partition 10 in the receptacle 2, the fibres will rise to the surface in the tank 2, from which they are in well-known manner skimmed off by a conveyer 11 and pass on to an outlet B while the clarified water is drawn off through outlets 12 in the bottom of the tank 2.

Fig. 2 shows a preferred embodiment of the nozzle device which is very simple and reliable. To the discharge end of the tube 3 a disc 13 is secured which, preferably, is plane. Below it a second disc 7a is arranged which, preferably, is plane and provided with holes so that it can slide freely on the stud bolts 14 screwed into the disc 13. The screw-spindle 8 abuts against the upper side of the disc 7a. Due to the vacuum generated at the operation the disc 7a is pressed upwards against the spindle 8 and may be set to the desired position by means of said spindle.

When the plant is out of operation, the disc 7a sinks down and rests on the heads of the bolts 14. If then the centrifugal pump 1 is started, the liquid flowing out through the nozzle device 6 initially generates a low vacuum only, and consequently during the starting period the pump works against a low counter-pressure, which is advantageous. Gradually as the vacuum increases it lifts the disc 7a upwards until the motion of said disc is checked by the spindle 8.

The invention is not restricted to the treatment of suspensions of fibres but may be applied also to other suspensions for recovering solid substances contained in them, for instance, for purifying sewage mechanically, for recovering coal-dust from the waste water, when coal is washed, etc. The method according to the invention may be used also for dressing ores and other minerals by flotation in which the mineral is finely crushed and suspended in water or another liquid.

What I claim is:

1. A method of separating a solid substance from a suspension thereof in a liquid comprising dissolving a gas in the suspension under pressure, flowing the suspension under pressure outwardly from a central point to abruptly diminish its velocity and momentarily reduce the pressure to below atmospheric under the effect of inertia of the suspension, passing the suspension into a relatively quiescent zone where the solid which has been released from suspension by the action of minute gas bubbles during the time of the vacuum then separates from the liquid, and removing the solid and clarified liquid separately from said zone.

2. A method of separating fibres from the waste water from paper, cellulose and similar machines, comprising, dissolving air under pressure in the waste water, flowing the waste water with dissolved gas under pressure outwardly from a central point to abruptly enlarge the area of flow and diminish the velocity of flow so as to momentarily reduce the pressure below atomspheric and form a large number of minute gas bubbles which adhere to the fibres and free them from suspension in the liquid, flowing the liquid and freed fibre into a body of liquid having a free upper surface where the fibre rises to the surface, skimming off the risen fibre from said surface, and removing the clarified water separately.

3. A method of separating solid substances from a suspension thereof in a liquid by flotation comprising dissolving a gas in the liquid under heavy pressure, forcing the suspension with the dissolved gas outwardly from a central point at high velocity to abruptly increase its flow area and reduce its velocity so as to momentarily reduce its pressure to below atmospheric and form a large number of minute gas bubbles which adhere to the solid particles and free them from suspension, passing the liquid and freed solids into a body of the liquid having a free surface and under atmospheric pressure where the solids rise to the surface, removing the solids from the surface, and separately removing the clarified liquid.

4. In a plant for separating a solid substance from a suspension thereof in a liquid, in combination, a container for the suspension, an open flotation tank under atmospheric pressure, a pipe from said container to said tank, an injector discharging into said pipe for pressing air into said pipe, means for moving the liquid through said pipe from said container to said tank, a throttled nozzle device on said pipe and discharging into said tank, said nozzle device having abruptly outwardly extending plates spaced apart and a central inlet, so that the suspension flowing through it due to the pressure in said pipe rapidly decreases in velocity and by its inertia generates a vacuum within said nozzle device, means for removing the solid substance rising to the surface of the liquid in said tank, and means for separately discharging the clarified liquid.

5. In a plant for separating a solid substance from a suspension thereof in a liquid, in combination, a container for the suspension, a flotation tank under atmospheric pressure, a pipe from said container to said tank, an injector discharging into said pipe for pressing air into said pipe, means for moving the liquid through said pipe from said container to said tank, a throttled nozzle device in said pipe and discharging into said tank, said nozzle device having a cross-section of flow continuously abruptly increasing in the outwardly direction, so that the velocity of the suspension flowing through it due to the pressure in said pipe abruptly decreases and, due to its inertia, generates a vacuum within said nozzle device, means for removing the solid substance rising to the surface of the liquid in said tank, and means for separately discharging the clarified liquid.

6. In a plant for separating a solid substance from a suspension thereof in a liquid, in combination, a container for the suspension, a tank, a pipe from said container to said tank, an injector discharging into said pipe for pressing air into said pipe, means for moving the suspension from said container to said tank through said pipe, a nozzle device in said pipe and discharging into said tank, said nozzle device comprising a substantially plane disc with a passage for the suspension and a substantially plane second disc parallel with said first disc and placed in front of said passage, so that the velocity of the suspension flowing through it due to the pressure in said pipe abruptly decreases and, due to its inertia, generates a vacuum within said nozzle device, means for removing the solid substance rising to the surface of the liquid in said tank, and means for separately discharging the clarified liquid.

7. In a plant for separating a solid substance from a suspension thereof in a liquid, in combination, a container for the suspension, a tank, a pipe from said container to said tank, an injector for pressing air into said pipe, means for moving the suspension from said container to said tank through said pipe, a nozzle device in said pipe and discharging into said tank, said nozzle device comprising a substantially plane disc with a passage for the suspension, and a substantially plane second disc parallel with said first disc and placed in front of said passage so that the suspension flowing through it due to the pressure in said pipe generates a vacuum within said nozzle device, said discs being adjustable in relation to each other, means for removing the solid substance rising to the surface of liquid in said tank and means for separately discharging the clarified liquid.

FREDRIK JUELL.